(12) United States Patent
Kessler et al.

(10) Patent No.: US 10,288,336 B2
(45) Date of Patent: May 14, 2019

(54) ICE DELIVERY DEVICE

(71) Applicant: Follett Corporation, Easton, PA (US)

(72) Inventors: Matthew James Kessler, Easton, PA (US); Stephen Eugene Rottloff, Quakertown, PA (US)

(73) Assignee: FOLLETT CORPORATION, Easton, PA (US)

( * ) Notice: Subject to any disclaimer, the term of this patent is extended or adjusted under 35 U.S.C. 154(b) by 0 days.

(21) Appl. No.: 15/623,140

(22) Filed: Jun. 14, 2017

(65) Prior Publication Data
US 2018/0363967 A1 Dec. 20, 2018

(51) Int. Cl.
*F25C 5/20* (2018.01)
*B65G 33/08* (2006.01)

(52) U.S. Cl.
CPC .............. *F25C 5/24* (2018.01); *B65G 33/08* (2013.01); *F25C 2500/08* (2013.01)

(58) Field of Classification Search
CPC ........ F25C 5/24; F25C 5/007; F25C 2500/08; B65G 33/08
USPC ....... 222/228, 217, 218, 231–241, 408, 409, 222/412–414, 146.6; 62/344, 340, 34
See application file for complete search history.

(56) References Cited

U.S. PATENT DOCUMENTS

| | | | |
|---|---|---|---|
| 2,794,577 A * | 6/1957 | Van Leeuwen | G01F 13/005 159/4.03 |
| 3,610,482 A * | 10/1971 | Van Steenburgh, Jr. | B65G 65/463 222/403 |
| 3,837,587 A | 9/1974 | Walter et al. | |
| 3,937,365 A | 2/1976 | Shelley et al. | |
| 4,168,805 A | 9/1979 | Taylor | |
| 4,207,995 A * | 6/1980 | Neely | A47J 31/404 222/231 |
| 4,248,276 A | 2/1981 | Gosnell | |
| 4,694,661 A | 9/1987 | Landers | |
| 4,732,301 A * | 3/1988 | Tobias | F25C 5/24 222/203 |
| 4,917,272 A * | 4/1990 | Ikeda | B65D 88/68 222/231 |
| 4,989,761 A * | 2/1991 | Ikeda | B65D 88/68 222/231 |
| 5,063,757 A * | 11/1991 | Ikeda | D06F 39/026 222/236 |
| 5,381,967 A * | 1/1995 | King | B65D 88/66 222/161 |
| 6,176,099 B1 * | 1/2001 | Hynes | F25C 5/185 62/344 |
| 6,599,007 B2 * | 7/2003 | Ryoo | A23G 9/22 222/231 |
| 6,860,408 B2 | 3/2005 | Hawkes | |

(Continued)

*Primary Examiner* — Lien Ngo
(74) *Attorney, Agent, or Firm* — Paul & Paul (57) ABSTRACT

An ice delivery device includes a bin for storing ice, a rotatable helical auger for delivering ice, and a rotatable agitator wheel with multiple flexible arms to help break up agglomerations of ice. The agitator wheel is mounted such that as the auger is rotated the auger successively engages arms of the agitator wheel to rotate the agitator wheel. If the agitator wheel encounters an obstruction, such as a mass of agglomerated ice, the auger displaces the flexible arm out of the plane of the agitator wheel thus permitting the auger to continue rotate to deliver ice. The agitator wheel is mounted on a pair of flexible liners, which are displaceable by agglomerated ice.

23 Claims, 4 Drawing Sheets

(56) References Cited

U.S. PATENT DOCUMENTS

| | | | |
|---|---|---|---|
| 7,263,844 | B2 | 9/2007 | Brunner et al. |
| 7,426,838 | B1 | 9/2008 | Shapiro et al. |
| 7,469,552 | B2 | 12/2008 | Brunner et al. |
| 7,681,408 | B2 * | 3/2010 | Hobson .................. B65B 43/36 62/137 |
| 7,958,918 | B2 | 6/2011 | Ladson |
| 8,756,950 | B2 | 6/2014 | Brunner et al. |
| 8,959,943 | B2 | 2/2015 | Schukar et al. |
| 9,557,089 | B2 * | 1/2017 | Visin ....................... F25C 5/182 |
| 2006/0277937 | A1 | 12/2006 | Schlosser et al. |
| 2011/0041542 | A1 | 2/2011 | Brunner et al. |
| 2013/0067947 | A1 | 3/2013 | Son et al. |

* cited by examiner

ICE DELIVERY DEVICE

BACKGROUND OF THE INVENTION

1. Field of the Invention

The present invention relates to a device for dispensing ice on an on-demand basis for consumer or commercial use.

2. Brief Description of the Prior Art

Ice dispensers are well known for use in commercial settings for proving ice for beverages in restaurants and for other purposes. Ice dispensers are disclosed, for example, in U.S. Pat. Nos. 4,248,276, 7,263,844, 7,469,552, 8,756,950, and U.S. 2011/0041542, all incorporated herein by reference. Typically, ice produced by such devices is stored in cube, chip, tubular or nugget form in a hopper or bin until needed. Often, such devices can be operated to deliver a predetermined portion of ice from the bin. When ice is provided to the bin and removed promptly, such devices tend to function well. However, when ice has been stored in the bin for an extended period, there is a tendency for the ice cubes, chips, nuggets, or tubular ice to agglomerate. When, after such an extended period without being operated, an ice dispenser is activated, such agglomerates may interfere with operation of the device, blocking delivery of the requested ice. In some cases, the agglomerated ice results in failure of the ice dispenser. Thus, there is a need for an ice dispenser which tends to break-up such agglomerates during operation of the device. Further, there is a need for an ice dispenser which resists blockage or failure due to agglomerated ice.

SUMMARY OF THE INVENTION

The present invention provides an ice delivery device including a bin or hopper for storing ice to be delivered to an outlet of the device. The bin has at least one wall. In a presently preferred embodiment, the bin includes a pair of spaced, generally parallel side walls, defining two sides of the bin, which are generally enclosed by a sloping front wall, a rear wall, a floor and a cover, forming an elongated generally rectangular enclosed interior for storing ice shavings, ice chips, ice cubes, or the like.

The ice delivery device also includes a mechanism for conveying ice for conveying ice from the bin to the outlet. Preferably, the mechanism for conveying ice is a rotatable helical auger for conveying ice from the bin to the outlet. The helical auger has a helix axis.

The ice delivery device also includes a rotatable agitator wheel having an axis of rotation and multiple arms extending in a plane perpendicular to the axis of rotation. Preferably, the arms of the agitator wheel are flexible.

The agitator wheel is preferably mounted for rotation such that the arms of the agitator wheel extend proximate to the mechanism for conveying ice. Preferably, the mechanism for conveying ice engages the agitator wheel to rotate the agitator wheel.

In a presently preferred embodiment, the agitator wheel is mounted for rotation such that as the auger is rotated about the helix axis the auger engages a first arm of the agitator wheel at a first position. In this embodiment, the auger then rotates the agitator wheel about the axis of rotation of the agitator wheel. In this embodiment, the auger disengages the first arm of the agitator wheel at a second position. In this embodiment, the agitator wheel rotates from the first position to the second position so as to position a second arm of the agitator wheel for engagement with the auger when the auger has disengaged from the first arm.

Preferably, the arms of the agitator wheel are sufficiently flexible such that when rotation of the agitator wheel is opposed by an obstruction in the bin, such as a mass of agglomerated ice, the force imparted by the rotating auger laterally displaces the arm of the agitator wheel in contact with the auger sufficiently so as to permit the auger to continue to rotate.

Preferably, the auger displaces an arm of the agitator wheel out of the plane of the agitator wheel as the auger continues to rotate when rotation of the agitator wheel is impaired by an obstruction in the bin, such as agglomerated ice.

Preferably, the device further includes at least one flexible liner mounted in the bin generally parallel and spaced from the at least one wall. The flexible liner is preferably mounted such that liner deflects outwardly away from the auger when the auger encounters an obstruction in the bin lodged between the auger and the flexible liner, such as an agglomeration of ice.

Preferably, in a presently preferred embodiment, the agitator wheel includes a hub, from which the hub extend the arms of the agitator wheel. Each arm of the agitator wheel includes a weakened portion proximate the hub such that the arm separates from the hub at the weakened portion when the force experienced by the arm exceeds a predetermined threshold.

Preferably, in a presently preferred embodiment, the agitator wheel includes a hub, from which the hub extend the arms of the agitator wheel. The hub includes lateral projections extending generally perpendicularly to the plane of the arms. In this embodiment, the bin preferably includes two walls, and the hub is mounted for rotation by a pair of bearings each being positioned proximate a respective one of the two walls. In this embodiment, the device further comprises at least two flexible liners mounted in the bin each being generally parallel and spaced from a respective one of the two walls. Each of the flexible liners is mounted such that the flexible liner deflects outwardly away from the auger when the auger encounters an obstruction in the bin lodged between the auger and the flexible liner. Each of the two bearings is mounted in a respective one the at least two flexible liners.

Preferably, each of the lateral projections of the hub form a generally conical section with a base proximate the plane of the agitator arms.

In a presently preferred embodiment, the agitator wheel is formed from a polymeric material, preferably, polypropylene.

In one presently preferred embodiment, the at least one flexible liner is formed from stainless steel.

In another presently preferred embodiment the at least one flexible liner is formed from a polymeric material.

The present invention also provides an ice delivery device comprising a bin for storing ice to be delivered to an outlet, the bin having at least one wall, as well as a rotatable helical auger for conveying ice from the bin to the outlet, the auger having an helix axis. In this case, the ice delivery device also includes a rotatable agitator wheel having an axis of rotation and multiple flexible arms extending in a plane perpendicular to the axis of rotation; with the agitator wheel being mounted for rotation such that as the auger is rotated about the helix axis the auger engages a first arm of the agitator wheel at a first position. The auger rotates the agitator wheel about the axis of rotation of the agitator wheel, such that the auger disengages the first arm of the agitator wheel at a second position. The agitator wheel rotates from the first position to the second position so as to position a second arm of the agitator wheel for engagement with the auger when the auger has disengaged from the first arm. The auger displaces an arm of the agitator wheel out of the plane of the agitator wheel as the auger continues to rotate when rotation of the agitator wheel is impaired by an obstruction in the bin. The delivery device also includes at least one flexible liner mounted in the bin generally parallel and spaced from the at least one wall, the flexible liner being mounted such that liner deflects outwardly away from the auger when the auger encounters an obstruction in the bin lodged between the auger and the flexible liner.

Preferably, the agitator wheel includes a hub from which hub extend the arms of the agitator wheel, with each arm of the agitator wheel including a weakened portion proximate the hub such that the arm separates from the hub at the weakened portion when the force experienced by the arm exceeds a predetermined threshold.

Preferably, the agitator wheel includes a hub from which the hub extend the arms of the agitator wheel, the hub including lateral projections extending generally perpendicularly to the plane of the arms.

Preferably, the bin includes two walls, and the hub is mounted for rotation by a pair of bearings each bearing being positioned proximate a respective one of the two walls.

Preferably, the device further comprises at least two flexible liners mounted in the bin each being generally parallel and spaced from a respective one of the two walls, with the flexible liners each being mounted such that the flexible liner deflects outwardly away from the auger when the auger encounters an obstruction in the bin lodged between the auger and the flexible liner, each of the two bearings being mounted in a respective one the at least two flexible liners.

Preferably, each of the lateral projections of the hub form a generally conical section with a base proximate the plane of the agitator arms.

Preferably, the agitator wheel is formed from a polymeric material.

Preferably, the agitator wheel is formed from polypropylene.

The present invention also provides an ice delivery device comprising a bin for storing ice to be delivered to an outlet. The bin has at least one wall. The ice delivery device also includes a rotatable helical auger for conveying ice from the bin to the outlet. The auger has an helix axis. The ice delivery device also includes at least one flexible liner mounted in the bin generally parallel and spaced from the at least one wall, the flexible liner being mounted such that liner deflects outwardly away from the auger when the auger encounters an obstruction in the bin lodged between the auger and the flexible liner.

DETAILED DESCRIPTION

The present invention provides an improved ice delivery device, which helps break up agglomerations of ice that can accumulate over time, such that the likelihood of machine downtime is reduced. While being stored, ice cubes, nuggets, and particles tend to bind to themselves, forming clumps larger than their initial respective sizes. These clumps can jam, or support ice above these clumps themselves, preventing ice from reaching the dispensing components of an ice dispensing machine or device. In the event that an ice dispensing machine experiences ice clumping that degrades its dispensing ability, it may be necessary to implement additional mechanical agitation to re-establish adequate dispensing. The task of adding agitation without also degrading the ice cleanliness, user safety or machine safety can be difficult.

The ice delivery device can include a mechanism for conveying ice from within a hopper to an outlet for delivering the conveyed ice. For example, the mechanism can be conveyer belt or the like, such as shown in U.S. Pat. No. 7,426,838, an ice transfer device such as shown in U.S. Patent Publication 2013/0067947, each incorporated herein by reference, or the like. Preferably, the mechanism for conveying ice employed in the ice delivery device according to the present invention is a helical auger, having a helical axis. Helical augers for conveying ice are disclosed for example, in U.S. Pat. Nos. 3,937,365, 3,837,587, 4,168,805, 4,694,661, 6,860,406, 7,958,918, and 8,959,943, and U.S. Patent Publication 2006/027793, all incorporated herein by reference.

The present invention can help reduce the dispensing problems caused by ice clumps. The present invention provides a means for breaking up ice clumps during regular operation of the device. Further, the means of breaking up the clumps preferably is provided with a large surface area, which is believed to limit the size and strength of clumps when they form.

The present invention improves user safety and satisfaction in that users do not have to manually agitate the ice; it is done automatically by the dispensing machine.

The present invention maintains a high level of safety in that it does not require a power source external to the bin. The present invention utilizes an existing dispense/agitation system as a power source. By avoiding the use of an external power source, the number of openings in the ice storage bin is not increased either. Thus, the present invention provides a leak-free ice delivery device. No new points of entry for pathogens or chemicals into the ice storage bin are provided. No new power components or connections are required which otherwise increase the likelihood of failure, power consumption and cost.

Further, the present invention advantageously provides a means of avoiding overloading which may otherwise be encountered by additional yet ineffective agitation.

The present invention provides specially shaped mechanical components that receive power from an existing dispense/agitation system and which flex if a force capable of stalling the dispense/agitation system is encountered. This temporary deformation prevents the dispense/agitation system from stalling.

The present invention provides an agitator or star wheel with a plurality of arms or spokes. The spoke is preferably shaped and designed to flex and not break under normal usage conditions. Preferably the spoke or arm is shaped and designed so that, if catastrophic forces are somehow applied to the agitator wheel, the resulting broken pieces will be large and less prone to ingestion by a user. This aspect enhances user safety.

Preferably, the agitator has a large surface area such that contact between ice on either side of the agitator is reduced, which tends to reduce the formation of clumps or aggregations of ice in the hopper. For example, in one presently preferred embodiment, the ratio of the surface area of the agitator wheel to the ice storage capacity of the hopper is at least 1.5 square inches per lb. ice storage capacity (21.3 square centimeters per kilogram), and more preferably, at least 2 square inches per lb. ice storage capacity (28.5 square centimeters per kilogram), and even more preferably at least 2.5 square inches per lb. of ice storage capacity (35.6 square centimeters per kilogram). By "surface area of the agitator wheel" is meant the area of one side of the wheel. By "ice storage capacity" is meant the nominal capacity of the bin for storing ice.

Preferably, scallops are provided in the end of the axle of the agitator wheel in order to aid drainage, so as not to create a habitat for biological growth or retain cleaning agents that may affect the flavor of the ice.

Preferably, the geometries of the components (draft angles, bend orientations, etc.) are selected so that there are no level geometries that will retain water or cleaning agents. This aspect serves to minimize biological growth habitat and retention of cleaning agents that may adversely affect flavor of the ice dispensed by the device.

Preferably, the geometries of the components are selected so that the system can only be assembled one way. This aspect makes installation easier and less prone to errors by the installer.

Preferably, the agitator wheel has spokes and a hub which are purposefully wide because their large surface area disrupts ice clump formation. Hence, when ice clumps do form, they are smaller and weaker than they would have been without the agitator wheel.

Preferably, the invention further provides flexible liner elements in the ice storage bin that serve to concentrate force from the existing dispense/agitation system, aiding the disintegration of ice clumps without stalling the existing dispense/agitation system.

Figure 1:
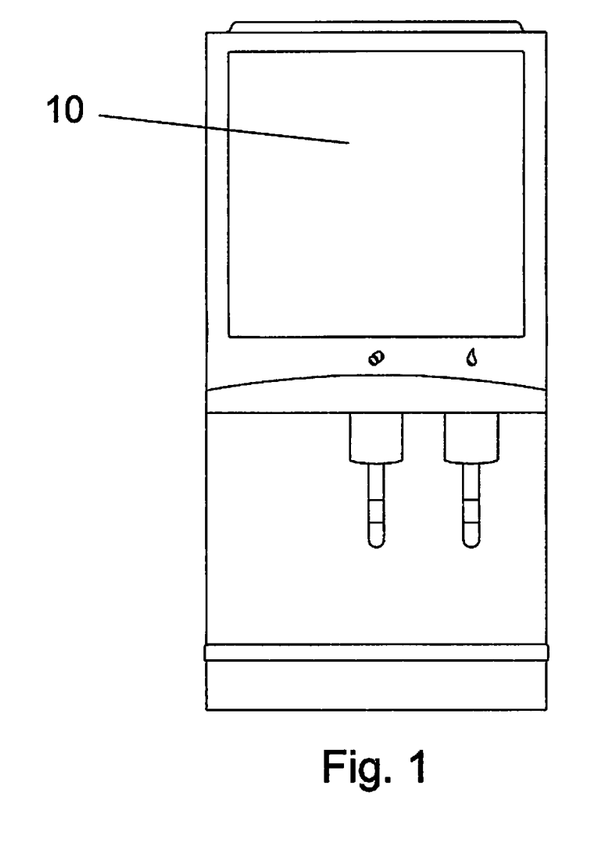
FIG. 1 is front elevational view of an ice delivery device according to the present invention.
Figure 2:
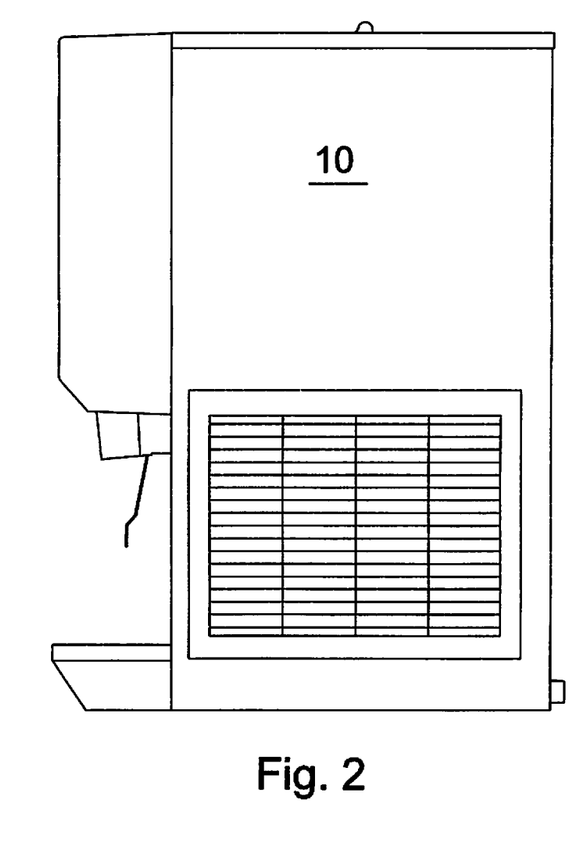
FIG. 2 is a side elevational view of the ice delivery device of FIG. 1.
Figure 4:
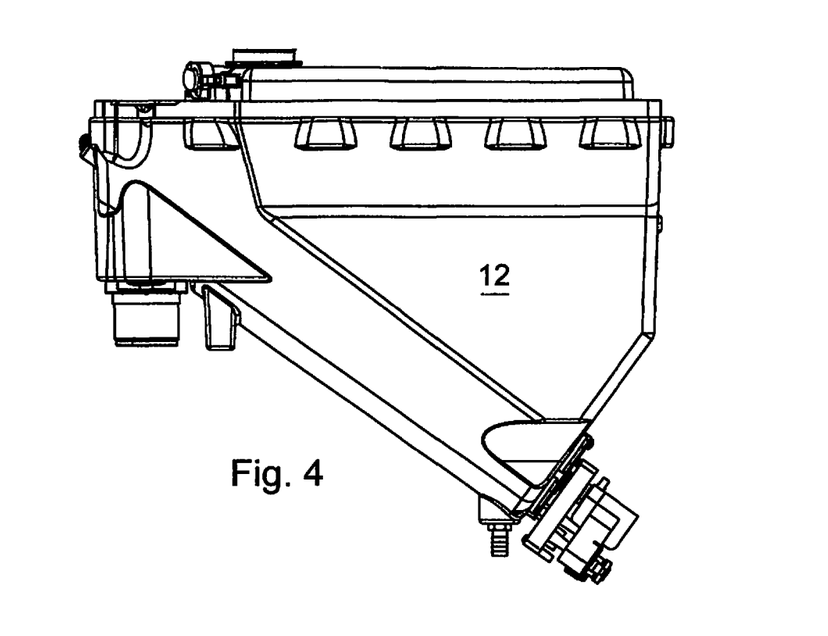
FIG. 4 is a right side elevational view of the ice bin or hopper of FIG. 3.
Figure 5:
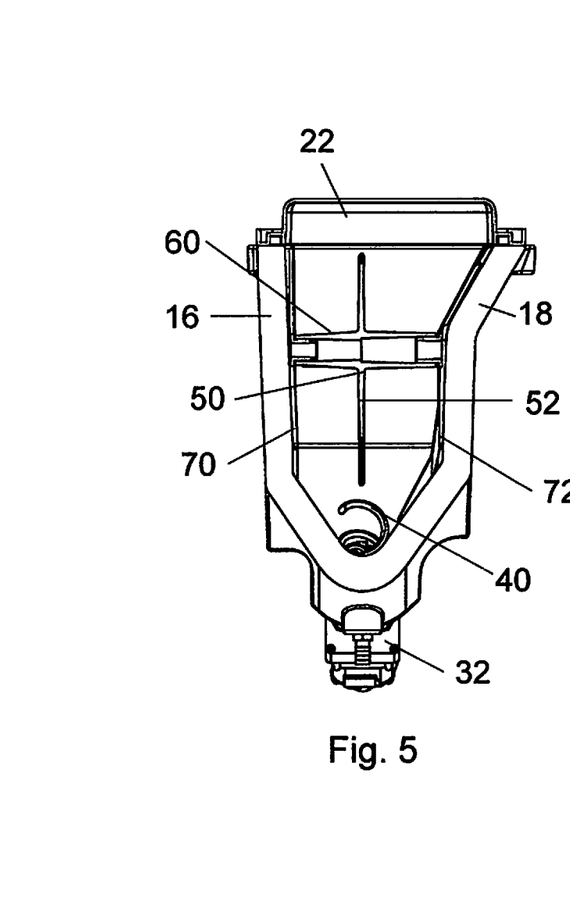
FIG. 5 is a sectional view of the ice bin of FIG. 3 taken along the line A-A.

Referring now to the figures in which like reference numerals represent like elements in each of the several views, there is shown in FIG. 1, a front elevational view of an ice delivery or dispensing device 10 according to a presently preferred first embodiment of the present invention. FIG. 2 depicts a right side elevation view of the ice delivery device 10 of FIG. 1. The ice delivery device 10 includes in its interior an ice storage bin or hopper 12, which is depicted in the top plan view of FIG. 3 and the right side elevational view of FIG. 4. The bin 12 includes a front wall 14, a left side wall 16, a right side wall 18, a rear wall 20, a cover 22, and a floor 24. The bin 12 is generally rectangular in plan view, as can be seen from FIG. 3. The left side wall 16 and the right side wall 18 are generally parallel to one another, as are the front wall 14 and the rear wall 20. The floor 24 of the bin 12 slopes upwardly from the rear of the bin 12 to the front of the bin 14. A downwardly oriented outlet 30 is provided at the front of the bin 12 for delivering stored ice to a user, and a motor 32 is provided as the rear of the bin 12 adjacent to the floor 24 for operating the device to deliver ice to a user. As can be seen in the plan view of FIG. 3, the bin 12 is not bilaterally symmetric. As can be seen in the elevational sectional view of FIG. 5, taken along line A-A of FIG. 3, the upper portion of the left wall 16 of the bin 12 extends generally vertically, while the upper portion of the right wall 18 includes a lower portion which extends generally vertically, and an upper portion which extends outwardly.

Figure 3:
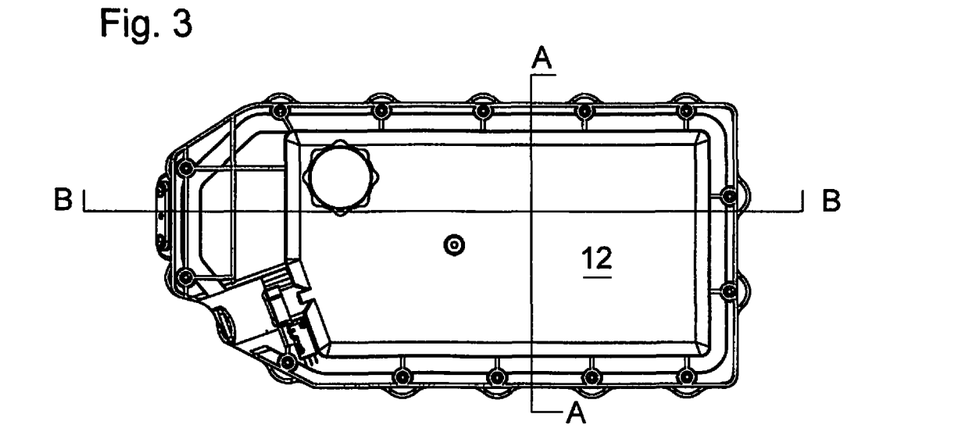
FIG. 3 is a top plan view of an ice bin or hopper of the ice delivery device of FIG. 1.
Figure 6:
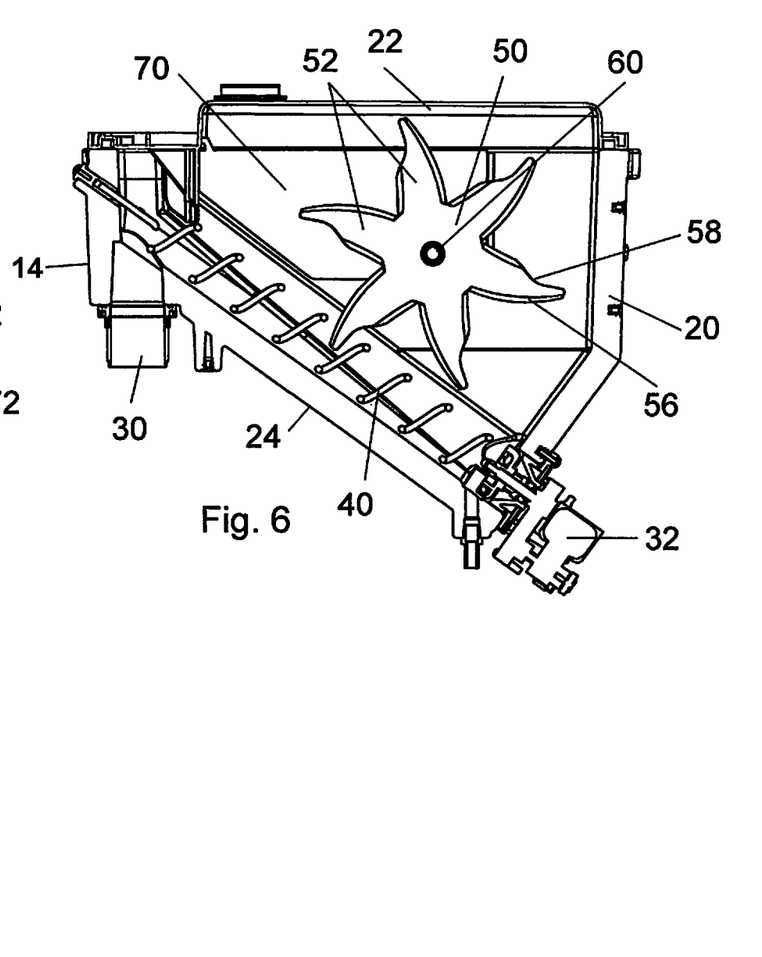
FIG. 6 is a sectional view of the ice bin of FIG. 3 taken along the line B-B.

As can be seen in the elevational section view of FIG. 6, taken along the line B-B of FIG. 3, a helical auger 40 is provided parallel the floor 24 of the bin 12 for delivering ice stored in the bin 12 to the outlet 30 of the bin 12. The auger 40 is driven by the motor 32.

Figure 7:
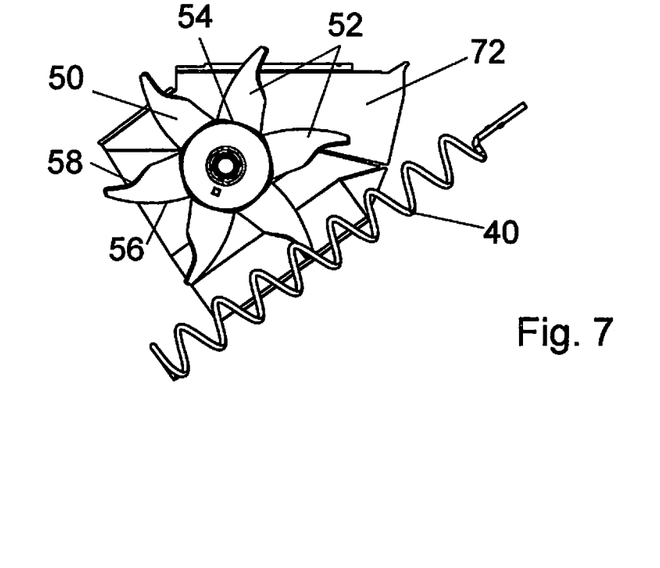
FIG. 7 is a fragmentary side elevational view showing the auger, agitator wheel, and right side liner of FIG. 6 as see from the left.
Figure 8:
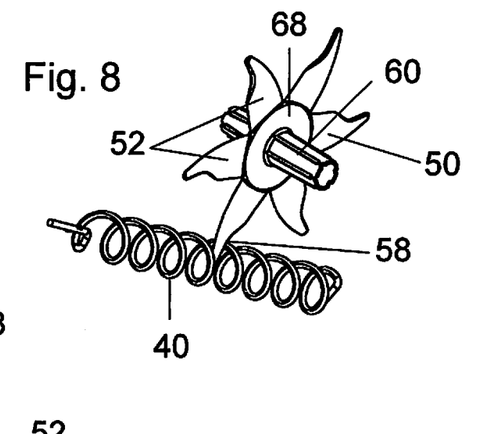
FIG. 8 is a fragmentary perspective view of the auger and agitator wheel of FIG. 7.

As can be seen in FIG. 6 the bin 12 also includes an agitator or star wheel 50 which includes a plurality of arms or spokes 52 and a hub 60. Each of the arms 52 has a leading edge 56 and a trailing edge 58. Each of the arms 52 extend from the hub 60 into the space defined by the helical auger 40, such that as the auger 40 is rotated by the motor 32, the auger 40 contacts the trailing edge of one of the arms 52 (FIGS. 7 and 8), and as the motor 32 continues to rotate the auger 40, the auger 40 pushes the trailing surface 58 of the arm 52, thus rotating the agitator wheel 50 in a clockwise direction, as seen from the right side of the bin 12. The arms 52 are spaced on the agitator wheel 50 such that as the auger 40 rotates one arm 52 sufficiently so that it no longer is in contact with the auger 40, another arm 52 has been rotated into a position (FIG. 6) so that this second arm 52 will be contacted by the auger 40 as the auger 40 continues to rotate. Thus, the rotatable agitator wheel 50 has an axis of rotation and multiple arms 52 extending in a plane perpendicular to the axis of rotation. The agitator wheel 50 is mounted for rotation such that as the helical auger 40 is rotated about the helix axis, the auger 40 engages a first arm of the agitator wheel 50 at a first position. The auger 40 in contact with this first arm rotates the agitator wheel 50 about the axis of rotation of the agitator wheel 50 until the auger 40 disengages the first arm of the agitator wheel 50 at a second position. Thus, the agitator wheel 50 is rotated from the first position to the second position so as to position a second arm of the agitator wheel 50 for engagement with the auger 40 when the auger 40 has disengaged from the first arm.

Preferably, the agitator wheel 50, and in particular each of the arms 52 of the agitator wheel 50, is formed from a flexible material having a flexural modulus of less than 2.5 GPa, such as polypropylene, polyethylene terephthalate, or polyethylene.

Preferably, the arms 52 present broad, smooth surfaces to reduce adherence of ice.

Figure 10:
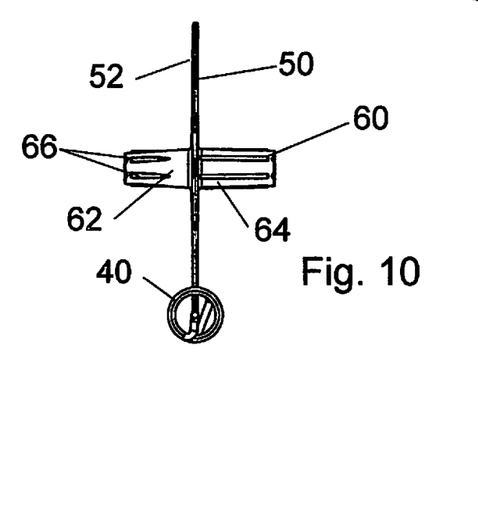
FIG. 10 is a front elevational view of the auger and agitator wheel of FIG. 8 as seen from a plane normal to the axis of the auger.

The hub 60 of the agitator wheel 50 includes a left lateral projection 62 and a right lateral projection 64 for mounting the agitator wheel 50 for rotation, best seen in FIG. 10. Each of the lateral projections 62, 64 is hollow and tapered inwardly such that the diameter of the generally cylindrical lateral projections 62, 64 diminishes in the respective direction away from the arms 52 of the agitator wheel 50. A plurality of raised ridges 66 are molded into the outside of the lateral projections 62, 64 parallel the axis of rotation of the agitator wheel 50 to strengthen the lateral projections 62, 64.

Each of the arms 52 of the agitator wheel 50 is secured to a central portion 68 of the agitator wheel 50. Grooves or weakened portions 54 are provided in the arm 52 proximate the central portion 68 of the agitator wheel 50, such that should the agitator wheel 50 encounter an unexpectedly high stress, the arm(s) 52 will tend to separate from the central portion 68 proximate the central portion 68, such that the resulting debris will be large and easily apparent among the ice otherwise delivered.

Figure 9:
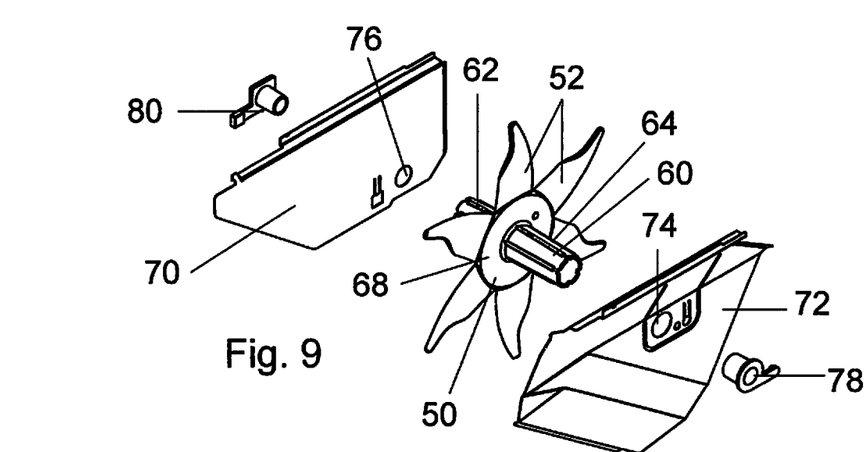
FIG. 9. is an exploded perspective view of the right and left side liners and the agitator wheel of FIG. 5.

The agitator wheel 50 is preferably mounted for rotation and supported by a pair of liners 70, 72, best seen in the exploded perspective fragmentary view of FIG. 9. The liners 70, 72 preferably have smooth surfaces to reduce the adherence of ice and to permit facile draining of water and cleaning solutions. The left side liner 70 and the right side line 72 are preferably formed from a thin, strong, flexible material such a stainless steel sheet stock, or a polymeric material such as polypropylene. The left side liner 70 includes a first aperture 76 for mounting the left lateral projection 62 of the hub 60, and the right side liner 72 includes a second aperture 74 for mounting the right lateral projection 64 of the hub 60. The left lateral projection 62 is secured in the first aperture 76 with a first bearing 80 and the right lateral projection 64 of the hub 60 is secured in the second aperture 74 with a second bearing 78.

The upper portions of the left liner 70 and the right liner 72 are preferably secured to the respective left bin wall 16 and right bin wall 18 proximate the bin cover 22 such that the left liner and 70 and the right liner 72 are spaced from and generally parallel to the respective walls 16, 18. Preferably, the flexible liners are mounted such that liners 70, 72 deflect outwardly away from the auger 40 when the auger encounters an obstruction in the bin lodged between the auger 40 and either of the flexible liners 70, 72.

Various modifications can be made in the details of the various embodiments of the articles of the present invention, all within the scope and spirit of the invention and defined by the appended claims.

The invention claimed is:

1. An ice delivery device comprising:
   a) a bin for storing ice to be delivered to an outlet, the bin having at least one wall;
   b) a mechanism for conveying ice from the bin to the outlet, and
   c) a rotatable agitator wheel having an axis of rotation and multiple flexible arms extending in a plane perpendicular to the axis of rotation; the agitator wheel being mounted for rotation such that the arms of the agitator wheel extend proximate to the mechanism for conveying ice, and the mechanism for conveying ice engages the agitator wheel to rotate the agitator wheel.

2. An ice delivery device according to claim 1 wherein the mechanism for conveying ice is a rotatable helical auger, the auger having an helix axis, the agitator wheel being mounted for rotation such that as the auger is rotated about the helix axis the auger engages a first arm of the agitator wheel at a first position, the auger rotating the agitator wheel about the axis of rotation of the agitator wheel, the auger disengaging the first arm of the agitator wheel at a second position, the agitator wheel rotating from the first position to the second position so as to position a second arm of the agitator wheel for engagement with the auger when the auger has disengaged from the first arm.

3. An ice delivery device according to claim 2 wherein the auger displaces an arm of the agitator wheel out of the plane of the agitator wheel as the auger continues to rotate when rotation of the agitator wheel is impaired by an obstruction in the bin.

4. An ice delivery device according to claim 2, the device further comprising at least one flexible liner mounted in the bin generally parallel and spaced from the at least one wall, the flexible liner being mounted such that liner deflects outwardly away from the auger when the auger encounters an obstruction in the bin lodged between the auger and the flexible liner.

5. An ice delivery device according to claim 2, the agitator wheel including a hub from which hub extend the arms of the agitator wheel, the hub including lateral projections extending generally perpendicularly to the plane of the arms.

6. An ice delivery device according to claim 5, wherein the bin includes two walls, the hub being mounted for rotation by a pair of bearings each being positioned proximate a respective one of the two walls.

7. An ice delivery device according to claim 6, the device further comprising at least two flexible liners mounted in the bin each being generally parallel and spaced from a respective one of the two walls, each of the flexible liners being mounted such that the flexible liner deflects outwardly away from the auger when the auger encounters an obstruction in the bin lodged between the auger and the flexible liner, each of the two bearings being mounted in a respective one of the at least two flexible liners.

8. An ice delivery device according to claim 6, wherein each of the lateral projections of the hub form a generally conical section with a base proximate the plane of the agitator arms.

9. An ice delivery device according to claim 1 wherein the agitator wheel is formed from a polymeric material.

10. An ice delivery device according to claim 9 wherein the agitator wheel is formed from polypropylene.

11. An ice delivery device according to claim 4 wherein the at least one flexible liner is formed from stainless steel.

12. An ice delivery device according to claim 4 wherein the at least one flexible liner is formed from a polymeric material.

13. An ice delivery device comprising:
   a) a bin for storing ice to be delivered to an outlet, the bin having at least one wall;
   b) a rotatable helical auger for conveying ice from the bin to the outlet, the auger having an helix axis;
   c) a rotatable agitator wheel having an axis of rotation and multiple flexible arms extending in a plane perpendicular to the axis of rotation; the agitator wheel being mounted for rotation such that as the auger is rotated about the helix axis the auger engages a first arm of the agitator wheel at a first position, the auger rotating the agitator wheel about the axis of rotation of the agitator wheel, the auger disengaging the first arm of the agitator wheel at a second position, the agitator wheel rotating from the first position to the second position so as to position a second arm of the agitator wheel for engagement with the auger when the auger has disengaged from the first arm;
   d) the auger displacing an arm of the agitator wheel out of the plane of the agitator wheel as the auger continues to rotate when rotation of the agitator wheel is impaired by an obstruction in the bin; and
   e) at least one flexible liner mounted in the bin generally parallel and spaced from the at least one wall, the flexible liner being mounted such that the liner deflects outwardly away from the auger when the auger encounters an obstruction in the bin lodged between the auger and the flexible liner.

14. An ice delivery device according to claim 13, the agitator wheel including a hub from which hub extend the arms of the agitator wheel, each arm of the agitator wheel including a weakened portion proximate the hub such that the arm separates from the hub at the weakened portion when the force experienced by the arm exceeds a predetermined threshold.

15. An ice delivery device according to claim 13, the agitator wheel including a hub from which hub extend the arms of the agitator wheel, the hub including lateral projections extending generally perpendicularly to the plane of the arms.

16. An ice delivery device according to claim 15, wherein the bin includes two walls, the hub being mounted for rotation by a pair of bearings each being positioned proximate a respective one of the two walls.

17. An ice delivery device according to claim 16, the device further comprising at least two flexible liners mounted in the bin each being generally parallel and spaced from a respective one of the two walls, the flexible liners each being mounted such that the flexible liner deflects outwardly away from the auger when the auger encounters an obstruction in the bin lodged between the auger and the flexible liner, each of the two bearings being mounted in a respective one of the at least two flexible liners.

18. An ice delivery device according to claim 16, wherein each of the lateral projections of the hub form a generally conical section with a base proximate the plane of the agitator arms.

19. An ice delivery device according to claim 13 wherein the agitator wheel is formed from a polymeric material.

20. An ice delivery device according to claim 19 wherein the agitator wheel is formed from polypropylene.

21. An ice delivery device comprising:
    a) a bin for storing ice to be delivered to an outlet, the bin having at least one wall;
    b) a rotatable helical auger for conveying ice from the bin to the outlet, the auger having an helix axis; and
    c) at least one flexible liner mounted in the bin generally parallel and spaced from the at least one wall, the flexible liner being mounted such that the liner deflects outwardly away from the auger when the auger encounters an obstruction in the bin lodged between the auger and the flexible liner.

22. An ice delivery device according to claim 2 wherein the ratio of the surface area of the agitator wheel to the ice storage capacity of the hopper is at least 2.5 square inches per lb. ice storage capacity.

23. An ice delivery device comprising:
    a) a bin for storing ice to be delivered to an outlet, the bin having at least one wall;
    b) a mechanism for conveying ice from the bin to the outlet, and
    c) a rotatable agitator wheel having an axis of rotation and multiple flexible arms extending in a plane perpendicular to the axis of rotation; the agitator wheel being mounted for rotation such that the arms of the agitator wheel extend proximate to the mechanism for conveying ice, and the mechanism for conveying ice engages the agitator wheel to rotate the agitator wheel;
    wherein the mechanism for conveying ice is a rotatable helical auger, the auger having an helix axis, the agitator wheel being mounted for rotation such that as the auger is rotated about the helix axis the auger engages a first arm of the agitator wheel at a first position, the auger rotating the agitator wheel about the axis of rotation of the agitator wheel, the auger disengaging the first arm of the agitator wheel at a second position, the agitator wheel rotating from the first position to the second position so as to position a second arm of the agitator wheel for engagement with the auger when the auger has disengaged from the first arm;
    the agitator wheel including a hub from which hub extend the arms of the agitator wheel, each arm of the agitator wheel including a weakened portion proximate the hub such that the arm separates from the hub at the weakened portion when the force experienced by the arm exceeds a predetermined threshold.

* * * * *